INVENTORS.
Harold E. Haynes &
Franz L. Putzrath

INVENTORS.
Harold E. Haynes &
Franz L. Putzrath
ATTORNEY.

United States Patent Office 2,985,065
Patented May 23, 1961

2,985,065
COMPOSITE PHOTOGRAPHY
Harold E. Haynes, Haddonfield, and Franz L. Putzrath, Oaklyn, N.J., assignors to Radio Corporation of America, a corporation of Delaware
Filed Mar. 15, 1957, Ser. No. 646,338
7 Claims. (Cl. 88—24)

This invention relates to systems for making a composite photograph from a plurality of photographs.

Various forms of motion-picture composite photography are described in the article "Some Special Photographic Effects Used in Motion-Picture Production," by Kellogg and Abbott, in the "Journal of the Society of Motion Picture and Television Engineers," vol. 64, February 1955, page 57. One form of such composite photography is known as the traveling-matte process. This traveling-matte process affords a system for combining a foreground, or action, photograph with a background photograph.

In a copending patent application by G. L. Dimmick, Serial No. 646,321, filed March 15, 1957, a system is described that uses scanning illumination techniques for making composite photographs such as the traveling-matte composites.

It is among the objects of this invention to provide:
A new and improved composite photography system;
A new and improved traveling-matte composite photography system;
A new and improved composite photography system employing scanning illumination techniques;
A new and improved composite photography system employing electronic scanning techniques.

In accordance with this invention, a system for producing a composite photograph from a plurality of photographs includes a system for directing a moving light to the photographs to be modified thereby and for directing the modified light to expose the composite photograph. This system includes means for exposing in accordance with a first one of the photographs the corresponding portions of the composite, and, then, subsequently exposing in accordance with a second one, the portions of the composite corresponding to the second one. The system also includes a means responsive to the light modified by one photograph for controlling the exposure of the composite in accordance with the other.

The foregoing and other objects, the advantages and novel features of this invention, as well as the invention itself both as to its organization and mode of operation, may be best understood from the following description when read in connection with the accompanying drawings, in which like reference numerals refer to like parts, and in which.

Figure 1:
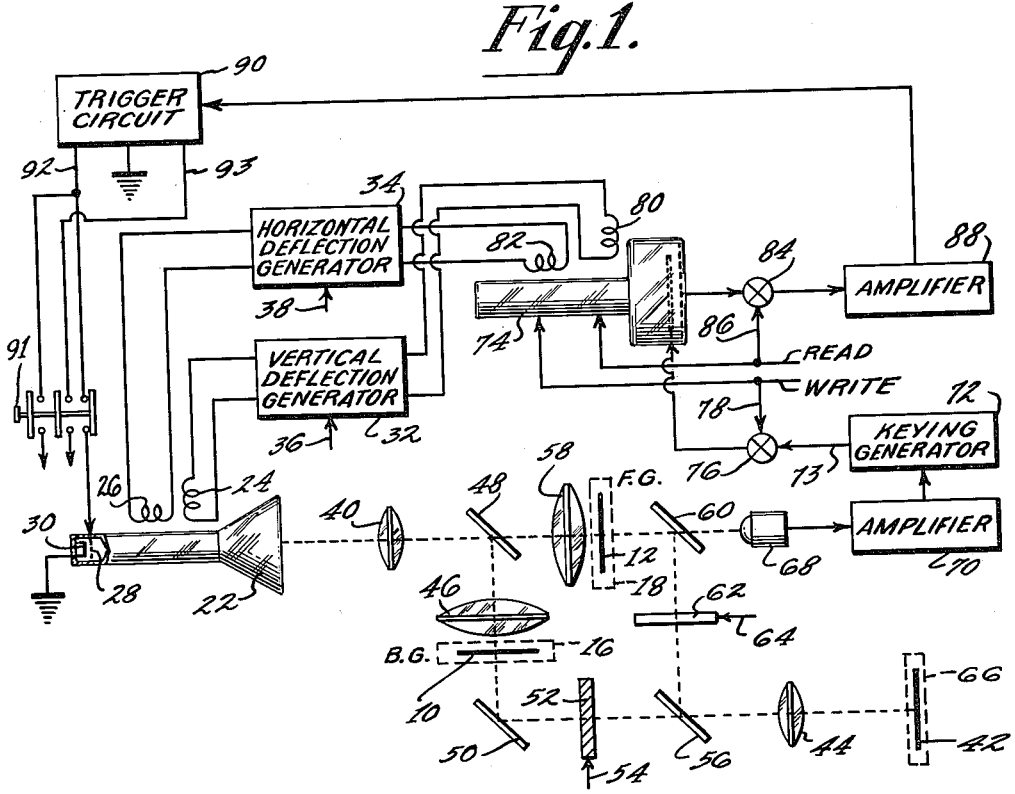
Figure 1 is a schematic block and optical diagram of a composite photography system embodying this invention.

In the composite photography system shown in Figure 1, two input photographs 10 and 12 are shown. The first film is sometimes designated a background (B.G.) film in composite photography. The second film is sometimes designated the foreground (F.G.), or action, film. In the system shown, the input films 10, 12 are transparencies. The foreground film 12 may be photographed with the action appearing against a certain backing. This backing provides in the film 12 a "surround" to the action that has an optical characteristic clearly distinct from any part of the action image area. For example, the surround to the action may be clear, that is, the density of the surround may be substantially less than any part of the action image area. In this way, a distinct transparent border is formed in the film 12 around the foreground action. Also, the surround to the action may be opaque, with a density substantially greater than any part of the action area. This distinction may also be spectral, and filters may be used to provide similar demarcations.

Two printer projector heads 16 and 18 are provided for the films 10 and 12, respectively. These heads 16 and 18 each include a film transport system for positioning the film in a suitably registered position, and a film advance control for synchronously advancing a frame to the registered position in response to a suitable signal.

Both films 10 and 12 are scanned by means of a flying-spot cathode ray tube 22. This tube 22 has vertical and horizontal deflection coils 24 and 26 and a suitable electron gun that includes a control electrode 28 and a cathode 30. Vertical and horizontal deflection generators 32 and 34, respectively, drive the coils 24 and 26 so that the light spot at the screen of the tube traverses a scanning raster. Synchronizing retrace signals from a suitable timing generator 94 (Figure 2) are applied to the generators 32 and 34 via connections 36 and 38, respectively.

Light from the screen (not shown) of the cathode ray tube 22 is directed by an imaging lens 40 to the film 10 via a partially transmitting mirror 48. The background film 10 is imaged onto a sensitized photographic film 42 by means of an imaging lens 44. A field lens 46 images the lens 40 at the lens 44 through a plate mirror 50, a mechanical shutter 52 which is actuated electrically via connection 54, and a partially transmitting mirror 56. The scanning light from the cathode ray tube 22 is also directed by the imaging lens 40 to the foreground film 12.

A field lens 58 images the lens 40 at the lens 44 via the partially transmitting mirror 60, a mechanical shutter 62 which is actuated electrically via connection 64, and a partially transmitting mirror 56. The lens 44 also images the foreground film 12 onto the composite output film 42. A suitable camera 66 for the film 42 to be exposed has a gate transport system operated in synchronism and register with those of the printer heads 16 and 18. The film advance of this camera 66 may be similarly actuated.

Scanning light transmitted by the foreground film 12 is also transmitted through the mirror 60 to a phototube 68. The output of the phototube 68 is applied to an amplifier 70, the output of which is applied to a keying generator 72. The generator 72 may take different forms; for example, this generator 72 may be a Schmitt trigger circuit which assumes two stable conditions in response to input voltage amplitudes in two distinct, non-overlapping ranges. For one of these two trigger circuit conditions, the voltage level at the output 73 is a relatively high voltage level, or "on" signal. For the other such condition, the output 73 supplies a relatively low voltage level, or "off" signal. Such trigger circuits may provide a set of oppositely phased output signals on a second output connection (for example, the circuit 90 discussed below).

The output of the generator 72 is applied to the "write" input of a cathode ray storage tube 74 via a switch 76. The switch 76 may be part of the usual storage tube control system which is actuated to a closed condition by a "write" signal applied to the connection 78. This same "write" signal conditions the tube 74 for storing the received signals. The storage tube 74 may be of the computer type, for example, tube type 6571. Storage tube type 6599 is also suitable. Vertical and horizontal deflection coils 80 and 82 for the storage tube 74 may be driven by the generators 32 and 34 to provide synchronous operation with the cathode ray tube 22 with a one-to-one correspondence of raster positions over each frame. The storage tube 74 is read out via a switch 84, which may be part of the usual storage tube control system, which switch 84 is actuated by "read" signals via the connection 86. The same "read" signals condition the tube 74 to read out the stored signals. Signals read out of the storage tube 74 through the switch 84 are amplified in an amplifier 88 and applied to a trigger circuit 90. The circuit 90 may be a Schmitt trigger having oppositely phased outputs 92 and 93. The output 92 of the trigger circuit 90 is the only one used with the timing system of Figure 2, and it is connected to the grid-cathode circuit of the cathode ray tube 22 via the push-button switch 91. Both outputs 92 and 93 are used with the system of Figure 4.

Figure 2:
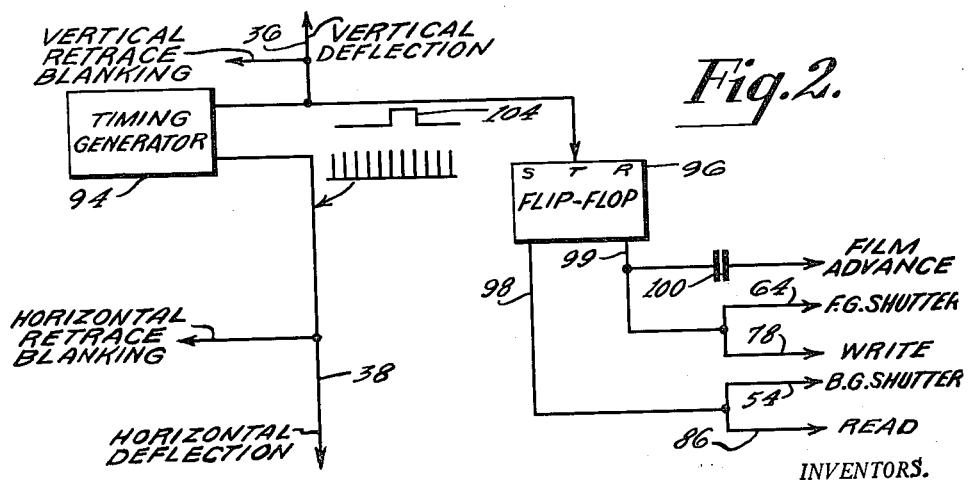
Figure 2 is a schematic block diagram of a timing control system that may be used with the system of Figure 1.

In Figure 2, a block diagram of a timing control system is shown, which system is suitable for controlling the operation of the system of Figure 1 with a foreground film 12 having an opaque surround. This timing system includes a timing generator 94 which supplies horizontal synchronizing pulses via connection 38 to the horizontal deflection generator 34. These horizontal sync pulses may be also used to control a suitable blanking arrangement (not shown) for each horizontal retrace in the tubes 22 and 74. The timing generator also supplies synchronizing pulses 104 to the vertical deflection generator 32 via the connection 36. These vertical sync pulses 104 may be used to control a vertical retrace blanking arrangement. The vertical sync pulses 104, which occur once for each scanning frame, are applied to the trigger input of a bistable flip-flop 96. The flip-flop 96 has two outputs 98 and 99. The output 98 is connected to the connections 54 and 86 of the system of Figure 1; and the output 99 is connected to the connections 64 and 78 of the system of Figure 1. The output 99 may also be coupled to a film advance control (not shown) via a capacitor coupling 100. With such an arrangement, the film advance receives a suitable actuating pulse upon reset of the flip-flop 96 once for each two frame pulses from the timing generator 94.

Figure 3:
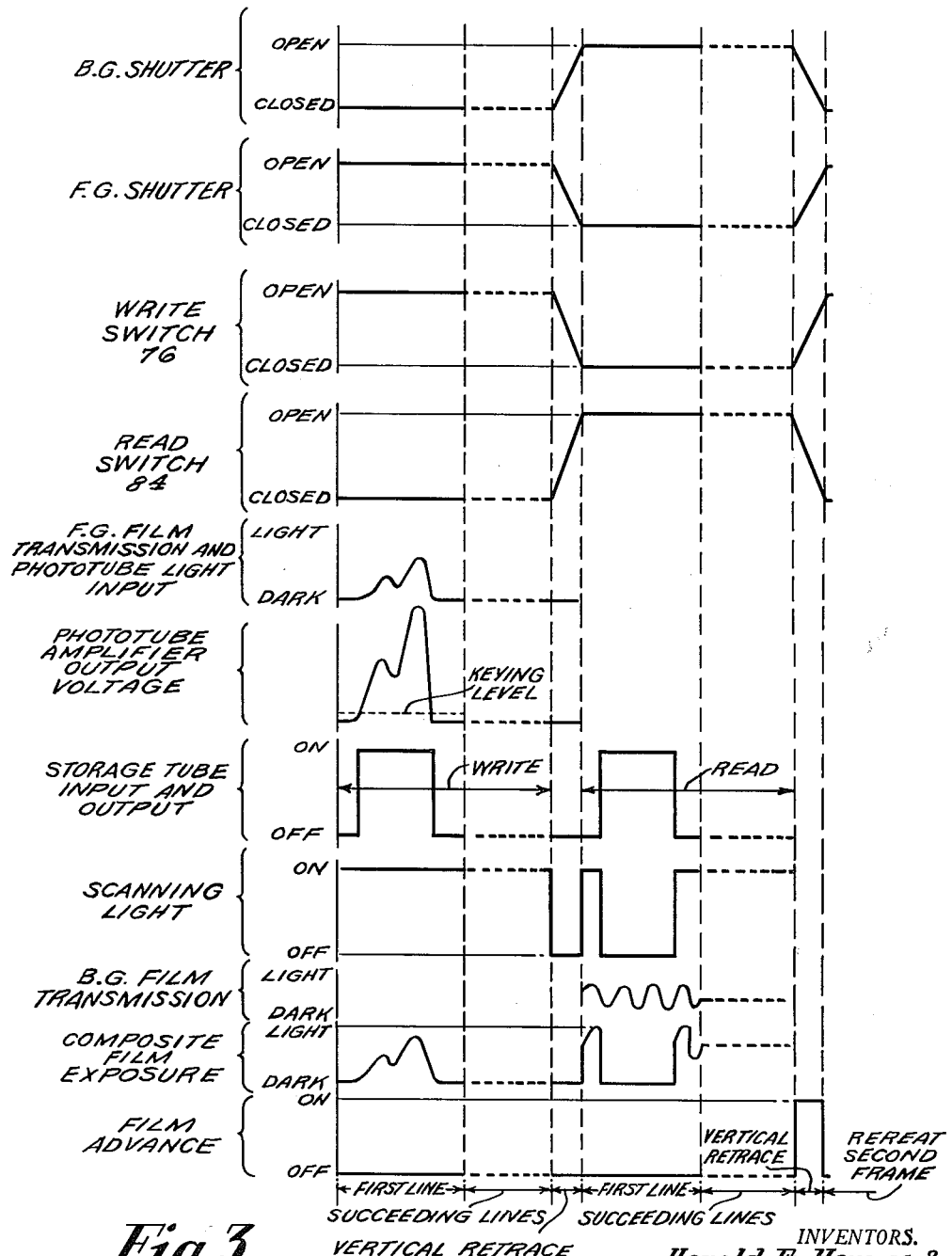
Figure 3 is an idealized graph of the time relationships of waveforms that may occur in certain portions of the combined system of Figures 1 and 2.

Reference is made to the graph of Figure 3 to explain the combined operation of the system of Figure 1 and Figure 2. Initially, the flip-flop 96 (Figure 2) is reset (R), so that the corresponding output 99 provides enabling signals on the connections 64 and 78. These enabling signals open the foreground shutter 62, close the write switch 76, and condition the storage tube 74 for write-in. The reset condition of the flip-flop 96 results in disabling signals on the flip-flop output 98. These disabling signals close the background shutter 54 and open the read switch 84. The proper foreground and background films 12 and 10, respectively, are registered in their projector heads 18 and 16, and an unexposed output film 42 is positioned in the camera 66. The open and closed shutter and switch conditions are shown graphically in Figure 3.

With the "read" switch open, the output of the amplifier 88 is a constant voltage. This constant voltage, applied to the input of the trigger circuit 90, maintains that trigger circuit 90 in a condition which turns on the beam of the cathode ray tube 22 to produce a constant, full light intensity of the scanning spot.

Consider the operation during the first horizontal scanning line. In Figure 3, there is a graphical representation of an assumed foreground film transmission characteristic for the first line scanned. As this first scanning line is traversed, the scanning light spot is initially directed to an opaque surround portion of the foreground film 12, then it is directed to an action region (represented by a varying waveform in Figure 3), and, finally, at the end of the first line, it is again directed to an opaque surround portion.

As the scanning light moves across the first horizontal line, the light transmitted by the action region of the foreground film is directed to the composite film 42 via the partially transmitting mirror 60, the open shutter 62, the partially transmitting mirror 56, and the lens 44. Thus, the composite film 42 is exposed in accordance with the projected image of the action portion of the foreground film 12. In the portions of the composite film 42 corresponding to the opaque (or substantially opaque) surround of the foreground film 12, there is no exposure (or but a negligible exposure). With each successive horizontal scanning line the scanning light spot from the cathode ray tube 22 illuminates the foreground film 12 to provide a projected image of the action region of this film 12 for exposure of the composite film 42. This exposure is repeated until the entire foreground film 12 has been scanned.

As the foreground film is scanned, light transmitted through that film 12 is directed to the phototube 68. Consider again the first scanning line that traverses the foreground film 12. As the scanning light spot is directed to the surround portion of that film 12, there is no light (or substantially no light) transmitted to the phototube 68. The output of the phototube 68, and of the amplifier 70, is such that the trigger circuit of the keying generator 72 produces at its output 73 a low voltage level. This low voltage level is represented in Figure 3 as an "off" signal in the binary sense in which it is written in the storage tube 74. Since the storage tube 74 and the scanning tube 22 are deflected synchronously, "off" signals are written in positions of the storage tube corresponding to the surround portions of the foreground film 12.

When the scanning light spot crosses into an action region of the foreground film 12, the light received by the phototube 68 increases sharply. The corresponding output of the phototube 68, and of the amplifier 70, increases sharply. As this output signal increases but a small amount, the keying, or triggering-on, level of the keying generator 72 is reached. The generator 72 is then changed to a condition to produce a high voltage, or "on" signal, at its output 73. This "on" signal at the output 73 remains constant throughout the traversal of an action region in the foreground film 12 by the scanning light spot. This "on" signal at the output 73 is written in the storage tube 74 at corresponding deflection positions. When the scanning light spot is again deflected to a surround region of the foreground film 12, the light received by the phototube 68 is reduced sharply. The output of the phototube 68 and amplifier 70 falls to a level below the keying level of the generator 72, and that generator 72 is returned to the condition producing The cathode ray tube 22 is used as a source of illumination for optically imaging the films 10 and 12 onto the composite film 42. Thus, there is no resolution limitation imposed by the size of the scanning light spot except in the vicinity of the border of the foreground image. The keying response from fine border detail depends upon the phosphor decay time, spot size, and scanning rate. Since the cathode ray tube 22 is used to generate an electronic switching signal, its phosphor should have a relatively fast decay.

Figure 4:
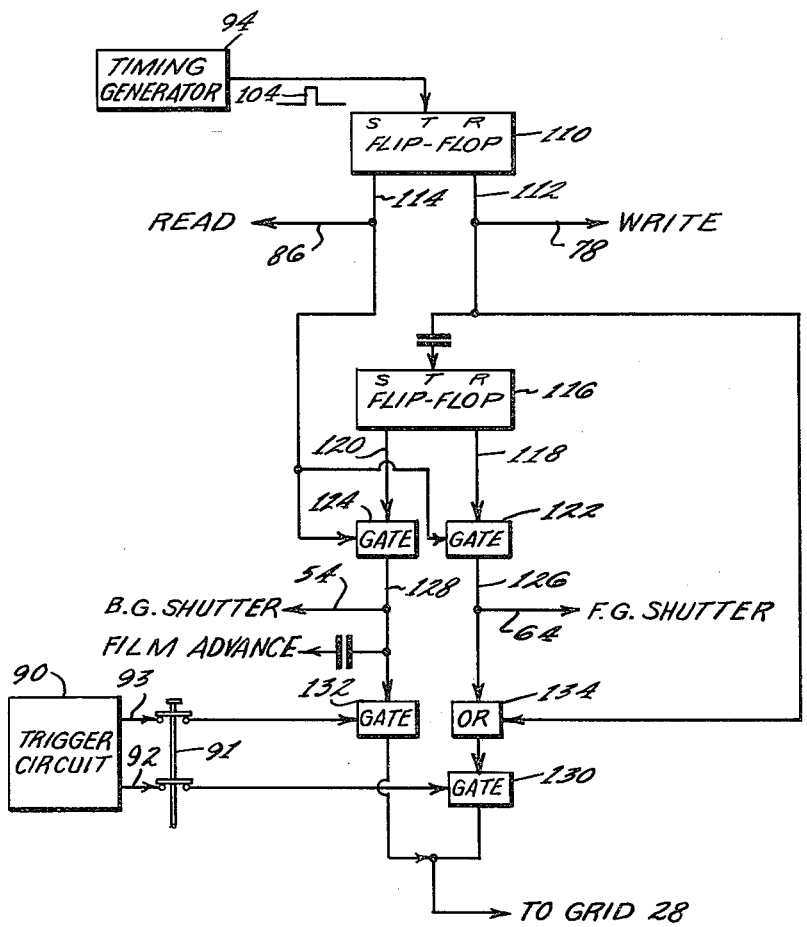
Figure 4 is a schematic block diagram of another timing control system that may be used with the system of Figure 1.

In Figure 4, a block diagram is shown of a timing and control system that may be used with the composite photography system of Figure 1, in which the foreground film 12 has a transparent surround. Parts corresponding to those previously described are referenced by the same numerals. Vertical sync pulses 104 from a timing generator 94 are applied to the trigger input of a flip-flop 110. Flip-flop outputs 112 and 144 provide enabling signals when the flip-flop 110 is in the reset and set conditions, respectively. These flip-flop outputs 112 and 114 provide disabling signals when the flip-flop 110 is in the respective reverse conditions. The output 112 is connected to the "write" signal connection 78 in the system of Figure 1. The flip-flop output 114 is connected to the "read" signal connection 86. The flip-flop output 112 is capacitively coupled to the trigger input of a second flip-flop 116. The flip-flops 110 and 116 operate as two stages of a binary counter. Flip-flop outputs 118 and 120 are connected to two coincidence gates 122 and 124, respectively. The flip-flop output 114 is connected to the other inputs of these gates 122 and 124. The gate 124 is connected to the background shutter control 54, and the gate 122 is connected to the foreground shutter control 64. The gate output 128 may also be capacitively coupled to the film advance control in the projection heads 16 and 18 and camera 66. The gate output 126 is connected to another gate 130 through an "or" gate, or buffer, 134, and the gate output 128 is connected to a gate 132. The flip-flop output 112 is also connected to the gate 130 through the buffer 134. These gates 130 and 132 receive, respectively, the signals from the outputs 92 and 93 of the trigger circuit 90 with the switch 91 in closed condition, as shown in Figure 4 (the direct connection of the output 92 to the grid 28 via the switch 91 shown in Figure 1 is broken). The outputs of the gates 130 and 132 are connected to the grid 28 of the scanning tube 22.

Figure 5:
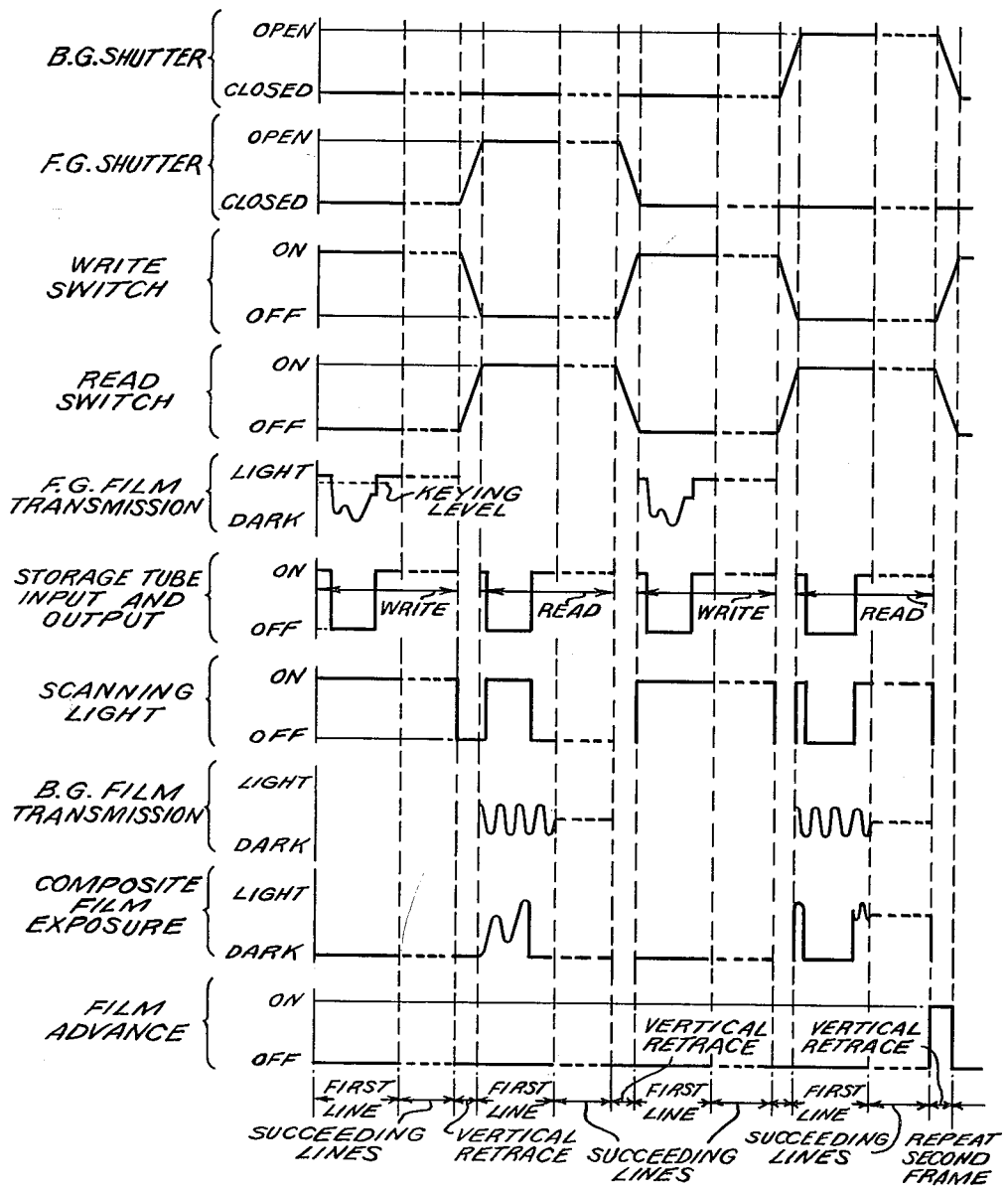
Figure 5 is an idealized graph of the time relationships of waveforms that may occur in certain portions of the combined system of Figures 1 and 4.

The combined operation of the system of Figure 1 and Figure 4 is described with reference to the graph of Figure 5, which shows the time relationships of certain operations occurring in this combined system. Initially, the flip-flops 110 and 116 are reset. Consequently, the "write" connection 78 receives an enabling signal, and the "read" connection 86 receives a disabling signal. The gates 122 and 124 operate to supply a disabling signal to their respective outputs 126 and 128 if either one of their inputs is a disabling signal, and an enabling signal only when both of their inputs are enabling signals. Thus, initially, the control connections 54 and 64 of both the background and foreground shutters 52 and 62 receive disabling signals, and these shutters are closed.

Also initially, the gate 132 is disabled by the disabling signal on the connection 128. The gate 130 is enabled by an enabling signal from the flip-flop output 112 passing through the "or" gate 134. Thus enabled, the gate 130 passes the signal on the trigger circuit output 92. Thereby, the signal on the trigger circuit output 92 is supplied to the grid 28 of the scanning tube 22 in a manner similar to that described above with respect to Figure 1.

A cycle of operation of the combined systems of Figures 1 and 4 has four parts to it: The first part is a recording, or writing, operation in the storage tube 74 accompanying a scanning of the foreground film 12. The second part is an exposure of the composite film 42 through the foreground film 12 under control of signals read out from the storage tube 74. The third part is a repetition of the recording operation as a result of an erasure of the stored signals during the previous read out. The fourth part is an exposure of the composite film 42 through the background film 10 under control of the signals read out from the storage tube 74.

During the first part of the cycle, the shutters 52 and 62 are closed as stated above for the initial conditions. Therefore, no exposure of the composite film 42 can take place at that time. The transmission characteristics of the foreground film 12, however, are converted to electrical signals by means of the phototube 68, and further converted by the keying generator 72 to binary electrical signals that are written in the storage tube 74 in a manner similar to that described above. The keying level of the generator 72 is indicated by dotted lines in Figure 5. The keying level may be readily adjusted to meet the requirements of the particular system used.

Due to the surround region of the foreground film 12 being transparent, that is, having a lower photographic density than the action region of that film 12, the keying generator 72 is triggered on to supply an "on" signal to its output 73 when the phototube output corresponds to a surround region. The keying generator 72 supplies an "off" signal to its output 73 when the phototube output corresponds to an action region. Thus, the stored signals in the tube 74 with operation of the system of Figure 4 are the inverse of those for the corresponding action and surround region in the system of Figure 2. The complete frame of the foreground film 12 is scanned line by line, in a manner similar to that described above, to record in binary fashion in the storage tube 74 a key image of the action region in the film 12.

When the complete frame of the foreground film has been scanned, the vertical sync pulse 104 triggers the flip-flop 110 to the set condition as it initiates retrace of the vertical scan. The write operation in the storage tube 74 is then terminated, and the read operation initiated by the enabling signal on the flip-flop output 114. As the flip-flop 110 is set, a signal is transferred to trigger the flip-flop 116 to the set condition. Enabling signals on the flip-flop outputs 114 and 118 are passed by the gate 122 to open the foreground shutter 62. The enabling signal on the gate output 126 also opens the gate 130 to pass the signals on the trigger circuit output 92 to the grid 28.

As explained above in connection with Figure 3, the signals on the trigger circuit output 92 tend to turn on the scanning tube 22 in response to "off" signals from the storage tube 74, and tend to turn off the scanning tube 22 in response to "on" signals from the storage tube 74. Under these circumstances, with the system of Figure 4 in the second part of the cycle, the scanning tube 22 is turned on only when in deflection positions corresponding to the action region of the foreground film 12. As a line by line scan through an entire frame is performed, stored key signals for corresponding deflections are read out of the tube 74 to trigger the circuit 90. The scanning tube 22 is turned off in deflection positions corresponding to the surround of the foreground film 12, and this tube 22 is turned on in deflection positions corresponding to the action region. As a result, the action region of the foreground film 12 is illuminated to expose the corresponding portions of the composite film 42 via the open shutter 62. Due to the closed background shutter 52, there is no exposure of the composite film 42 by an image from the background film 10 at this time.

Upon completion of the scanning of the foreground film 12 and the exposure of the foreground image on the composite film 42, the next vertical sync pulse 104 triggers the flip-flop 110 back to the reset condition. This resetting of the flip-flop 110 triggers the flip-flop 116 to the set condition. As a result, both gate outputs 126 and 128 have disabling signals that close the foreground and an "off" output signal. This "off" output signal is written in the storage tube 74 at the corresponding locations.

This recording operation in the storage tube 74 of "on" and "off" signals corresponding, respectively, to action and surround portions of the foreground film 12 is repeated for each successive horizontal line for the entire raster frame corresponding to the entire foreground film 12. Thereby, a key image of the foreground action region is stored in the tube 74 in the form of binary signals. With each horizontal retrace, the scanning light spot may be blanked in a suitable manner. This blanking of both the scanning tube 22 and the storage tube 74 prevents any recording action during the retrace.

Thus, the scanning operation over a complete raster produces an exposure in the composite film 42 corresponding to the action portion of the foreground film 12, and a recording in the storage tube 74 of "on" and "off" signals corresponding, respectively, to action and foreground regions of this foreground film 12. In this scanning operation, the background shutter 54 is closed, so that there is no effect on the composite film 42 of light directed to the background film 10 at this time.

When the frame has been completely scanned, there is a vertical synchronizing pulse 104 supplied by the timing generator 94, which vertical sync pulse 104 controls the vertical retrace blanking and the vertical deflection generator 32 in a suitable manner. This vertical sync pulse 104 is also applied to the trigger input of the flip-flop 96 to set that flip-flop 96. With the flip-flop 96 in the set (S) condition, the output 98 receives an enabling signal which opens the background shutter 52, closes the read switch 84, and conditions the tube 74 for read-out. At the same time, the output 99 receives a disabling signal which closes the foreground shutter 62 and opens the write switch 76.

As the beam of the scanning tube 22 is deflected through its raster, a read-out operation is performed in the storage tube 74 at corresponding deflection positions. The stored "on" and "off" signals are read out, passed by the closed switch 84, amplified, and applied to the trigger circuit 90. The signals at the trigger circuit output 92 are supplied to the grid-cathode circuit of the cathode ray tube 22. These signals are such that the tube 22 has its scanning light turned on for "off" signals read out from the storage tube 74, and the scanning tube 22 is turned off for "on" signals that are read out. Thus, the operating conditions for the scanning tube 22 during this "read" operation is the reverse of that during the writing operation. Accordingly, the scanning tube 22 is turned on in raster positions corresponding to the surround portion of the foreground film 12, and it is turned off in raster positions corresponding to the action portions of the foreground film 12.

Consider the first raster line during the "read" operation. The scanning light is on during the initial traversal of a surround portion of the foreground film 12. Therefore, the corresponding portion of the background film 10 is illuminated and imaged onto the corresponding portion of the composite film 42 via the mirror 50, the now-open shutter 52, the partially transmitting mirror 56, and the lens 44. As the scanning light traverses deflection positions corresponding to this surround portion of the foreground film, all of the corresponding portions of the background film are imaged on the composite film 42 to expose that film 42 in the appropriate places.

When the scanning light is deflected to a raster position corresponding to the action portion of the foreground film 12, the signals read out of the storage tube 74 are such that the trigger circuit 90 turns off the scanning tube 22. Thus, the corresponding portions of the background film 10 are not illuminated, and the only exposure at the corresponding portions of the composite film 42 is the previously recorded action image of the foreground film 12. The scanning tube 22 remains off throughout the traversal of deflection positions corresponding to the action region of the foreground film 12. When the deflection position again corresponds to the surround portion, the signals read out of the storage tubes 74 are such that the trigger circuit 90 returns the scanning tube 22 to the on condition. The portions of the background film 10 corresponding to the surround of the foreground film 12 are again illuminated to expose the composite film 42 at its corresponding portions.

This operation is repeated for each successive horizontal line to illuminate the background film 10 at all portions of the surround of the foreground film 12. Since the scanning tube 22 is extinguished in deflection positions corresponding to the action region of the foreground film 12, the corresponding portions of the background film 10 are not illuminated, and the corresponding portions of the composite film 42 are not affected by the background image. Thereby, the portions of the background film 10 corresponding to the action region of the foreground film 12 are omitted from the composite film 42. Accordingly, the foreground exposure on the composite film 42 appears to be in front of the background exposure on that film 42.

Depending upon the subject matter of the foreground film 12, there may be a plurality of such switching operations of the tube 22 with each scanning line, or there may be no switching operation in the particular line. The exposure of the film 42 in the situation in which there is no such switching on and off of the tube 22 in any particular horizontal line is either all foreground or all background. Thus, with a complete scanning of a frame of the films 10 and 12, a composite film 42 is exposed that has effectively a foreground image inserted in front of a background image.

When the second scanning frame is completed, another vertical sync pulse 104 is supplied by the timing generator 94 to trigger the flip-flop 96 back to its reset condition. During this vertical sync pulse, the shutters 62 and 52 and the switches 76 and 84 have their conditions reversed to the conditions described above for the initial condition. At the same time, the change in signal level at the output 99 in the enabling direction is passed by the coupling capacitor 100 to actuate a film advance in the film transports of the projection heads 16 and 18 and of the camera 66. The system is then in a condition to repeat the cycle of operation described above.

In certain applications, the input films may not be describable as "foreground" and "background." However, the image of one of the input films is to be inserted in front of the image of the other. The border of the image to be inserted is used as the key image that controls the switching operation in a manner described above with respect to Figure 1, in which the foreground image operates as the key image.

The input films 10 and 12 may be black and white transparencies and either positives or negatives depending upon the requirements of a particular system. The composite film 42 for such inputs is likewise a black and white film, and the photographic reverse of the input. The input films 10 and 12 may also be color transparencies. The composite film 42 is then either a black and white separation or a color positive from color negative, depending upon the photographic printing system employed. If the distinction between the action and surround regions of the foreground film 12 are spectral, then a suitable filter (not shown) may be needed between that film and the mirror 60. Where the scanned films have spectral characteristics, the spectral characteristics of phosphors and the illuminating cathode ray tube screen become significant. Among the known techniques for deriving a foreground film that has a suitable distinct surround for supplying keying information is that in which an ultraviolet sensitive film is exposed with the foreground scene in front of a screen backlighted with ultraviolet light.

background shutters 62 and 52 again. The enabling signal on the flip-flop output 112 opens the gate 130 to pass the signal from the trigger circuit output 92 to turn on the scanning tube 22.

The foreground film 12 is again scanned in a manner similar to the first part of the cycle of operation to write in the storage tube 74 a key record in binary form of the action region of the foreground film 12. This third part of the cycle is performed if the read-out during the second part erased, or destroyed, the stored key signals. If the read-out is non-destructive during the second part, this third part of the cycle may be omitted.

The next vertical sync pulse 104 triggers the flip-flop 110 to the set condition. Enabling signals on the flip-flop outputs 114 and 120 at this time pass an enabling signal to the gate output 128 to open the background shutter 52 and to open the gate 132 to the signals on the trigger circuit output 93. Disabling signals on the flip-flop outputs 112 and 118 close the gates 122 and 130.

Under these circumstances, the scanning light from the cathode ray tube 22 illuminates the background film 10, and an image of that film 10 exposes the composite film 42. The control of the scanning tube beam is by way of the trigger circuit output 93. Therefore, the tube 22 is turned on in deflection positions corresponding to the surround region of the foreground film 12, and turned off in deflection positions corresponding to the action region. Accordingly, there is no illumination of the background film 10, nor exposure of the composite film 42, in deflection positions corresponding to the action region already exposed on the composite film 42.

When the deflection of that frame is completed, the next vertical sync pulse 104 resets the flip-flop 110, which, in turn, resets the flip-flop 116. The change in signal at the gate output 128 in the disabling signal direction may be used by way of the capacitive coupling to the film advance to actuate that film advance in the projection heads 16 and 18 and in the camera 66. Thus, at the end of the fourth part of the cycle, the system has the next set of input films 10 and 12 and an unexposed film 42 to receive the next composite image. The flip-flops 110 and 116 are reset, and the combined system of Figures 1 and 4 otherwise assumes the initial conditions discussed above, and is ready to start a new cycle of operation.

Storage, or recording, systems, other than storage tubes, for storing electrical signals representing a key image may be used. For example, magnetic tape recording may be used and such tape can store the deflection signals for playback as well as the key image signals.

Figure 6:
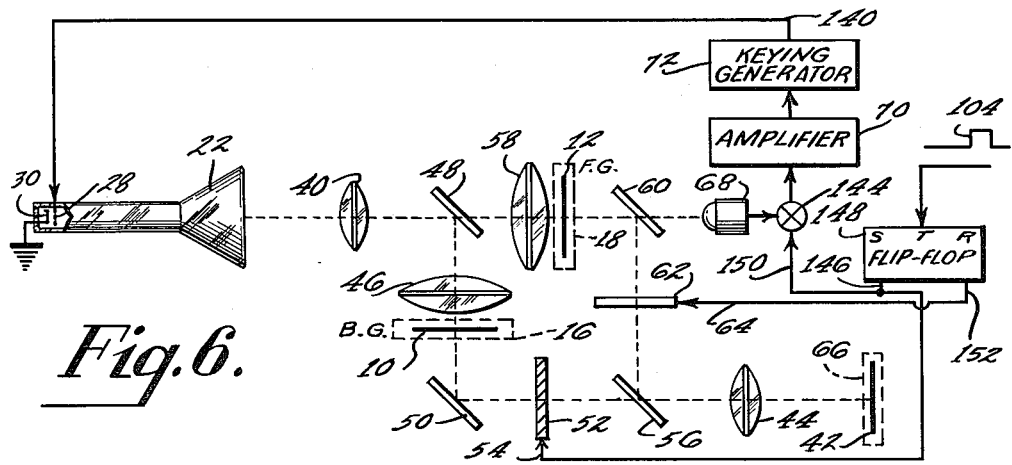
Figure 6 is a schematic block and optical diagram of another composite photography system embodying this invention.

In the system of Figure 6, a storage tube is not used. Parts corresponding to those previously described are referenced by the same numerals. The optical trains and the electromechanical shutters in the system of Figure 6 are similar to those of Figure 1. An output 140 of the keying generator 72 is connected directly to the grid 28 of the scanning tube 22 (this output 140 supplies signals that are the inverse of those from output 73 in Figure 1). A switch 144 connects the output of the phototube 68 to the amplifier 70. One output 146 of a flip-flop 148 is connected to the control connection 150 of the switch 144, and that same flip-flop output 146 is connected to the background shutter control connection 54. The other flip-flop output 152 is connected to the foreground shutter control connection 64.

Figure 7:
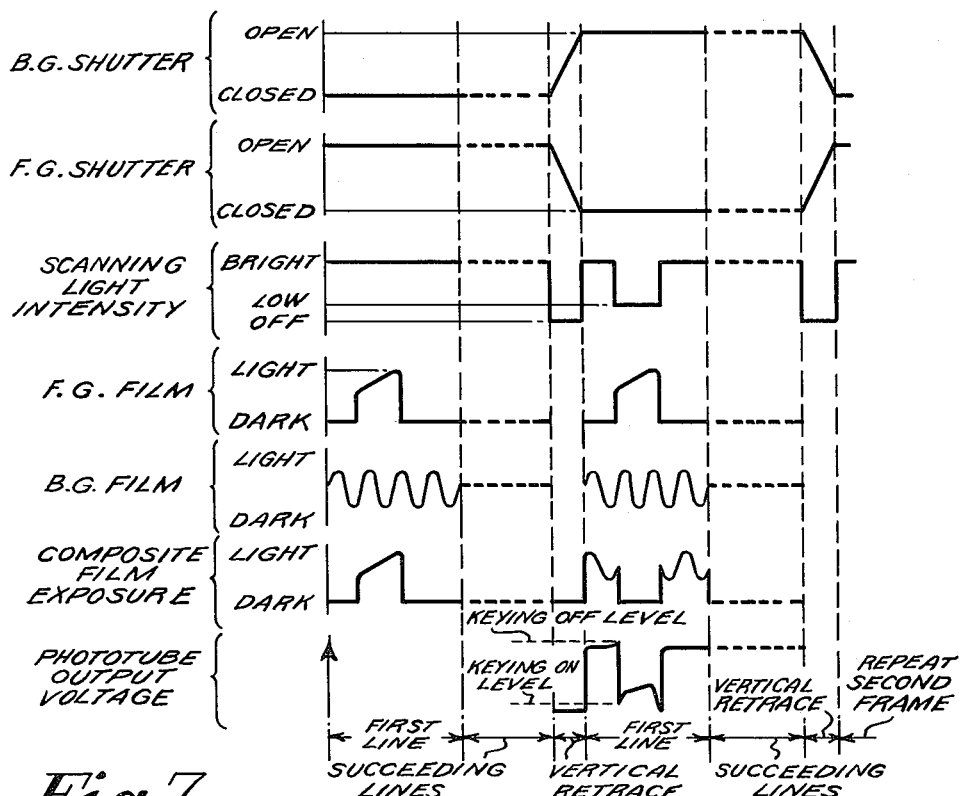
Figure 7 is an idealized graph of the time relationships of waveforms that may occur in certain portions of the system of Figure 6.

Reference is made to the graph of Figure 7 to explain the operation of the system of Figure 6 with a foreground film 12 that has an opaque surround. Initially, the flip-flop 148 is reset, which results in the switch 144 being open, the background shutter 52 being closed, and the foreground shutter 62 being open.

During the first half of a cycle of operation, the light spot of the scanning tube 22 has full illuminating intensity as the beam is deflected over the entire raster of a frame. The scanning light from the tube 22 illuminates the foreground film 12 to expose the composite film 42 in the portions corresponding to the action of the foreground film 12. The opaque surround portions of that foreground film 12 prevent any exposure in the corresponding background portions of the composite film 42.

Upon completion of this first frame of the cycle of operation, the vertical sync pulse 104 triggers the flip-flop 148 to the set condition. As a result, the foreground shutter 62 is closed, the background shutter 52 is opened, and the switch 150 is closed to pass signals between the phototube 68 and the amplifier 70. The keying generator 72 is arranged to produce voltages at the output 140 which are such that the beam intensity and the corresponding scanning light intensity are at full value when an opaque surround portion of the foreground film 12 is being scanned, and are at a relatively low value, almost off, when the deflection position corresponds to the action region of the foreground film 12.

As the surround portion of the foreground film is scanned, the background film 10 is illuminated, and the composite film is exposed accordingly. When the scanning light moves into an action region of the foreground film 12, the sudden increase of light received by the phototube 68 results in a triggering of the keying generator 72. The signal at the output 140 reduces the light intensity of the scanning light spot to a very low value suitable for phototube detection. But this scanning light intensity is so low that there is only a negligible additional exposure of the composite film 42 in the portions already exposed to the foreground image. When the scanning light spot is moved to a surround region from the action region, there is a sudden reduction in the light received by the phototube 68, and a corresponding triggering action of the keying generator 72. As a result, the voltage at the generator output 140 is substantially increased to return the scanning light to full, illuminating intensity. The portions of the background film 10 corresponding to the surround of the foreground film are then illuminated and imaged on the composite film 42. This operation is repeated for the remainder of the scanning frame. Thereby, all the portions of the background film corresponding to the surround expose the composite film 42.

Upon completion of this half of the cycle, the next sync pulse 104 resets the flip-flop 148. This resetting operation restores the system to its initial condition to start the next cycle. The resetting may also be used to actuate the film advance.

Either half of the exposure cycle may be performed first. For example, the exposure of the composite film 42 in accordance with the background film may be performed prior to the exposure in accordance with the foreground film with advantage under certain circumstances. That is, the light transmitted by the background film 10 in regions corresponding to the action region may have less effect on an unexposed film 42 than the same amount of light would have on a film already exposed through the action region of the foreground film 12.

Figure 8:
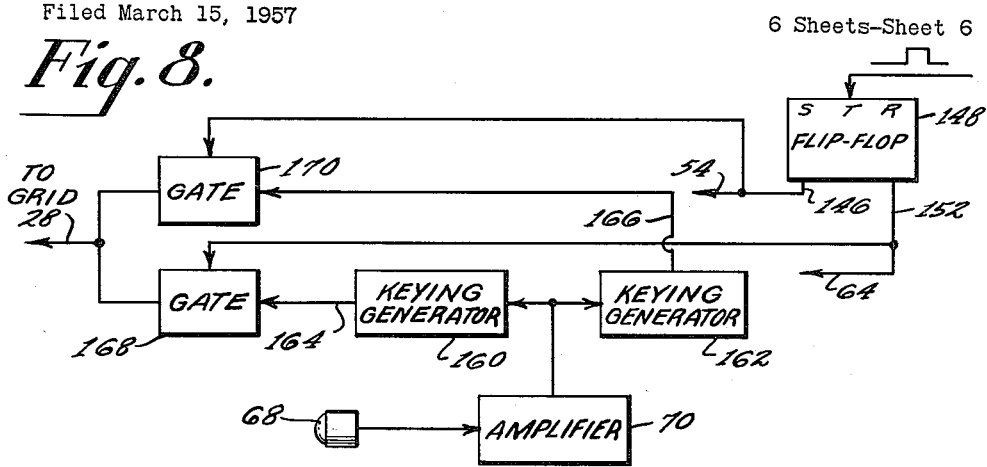
Figure 8 is a schematic diagram of a portion of a modification of the system of Figure 6.

A modification of the system of Figure 6 for use with foreground films having a clear surround is shown in Figure 8 in which parts corresponding to those previously described are referenced by the same numerals. The phototube 68 has its output connected to the amplifier 70, the output of which is connected to two keying generators 160 and 162. The outputs 164 and 166 of these generators 160 and 162 are connected to two gates 168 and 170, respectively. The outputs of the gates 168 and 170 are both connected to the grid of the scanning tube 22. The flip-flop output 146 provides enabling and disabling signals for the gate 170; and the flip-flop output 152 provides similar signals for gate 168.

The two keying generators 160 and 162 are used in different half cycles of the exposure of the composite film 42. The output of the keying generator 160 is used during the exposure in accordance with the foregoing film 12. As indicated in the graph of Figure 8, the hysteresis characteristic of the keying generator 160 and the output signals at the generator output 164 are such that the scanning tube light spot is switched to a bright illuminating intensity whenever the phototube output falls below a certain relatively low value. This light spot intensity is switched to a relatively low value (used only for keying purposes) whenever the photocell output becomes a relatively high value (corresponding to the clear surround of the foreground film 12). The keying generator 160 is used during the exposure in accordance with the foreground film 12 and switches the tube to provide illumination for this purpose.

The hysteresis characteristic of the keying generator 162 and the signals at the generator output 166 are such that the scanning light intensity is switched to illuminating intensity when the output of the phototube 68 changes to a very high level (corresponding to the clear surround of the foreground film 12); and the scanning light intensity is switched to a very low value (used only for keying purposes) when the light received by the phototube 68 falls to another high value just below the other switching value. The keying generator 162, therefore, operates during exposure in accordance with the background film 10, and switches the scanning light intensity to the illuminating exposure value in deflection positions corresponding to the surround of the foreground for this purpose.

Figure 9:
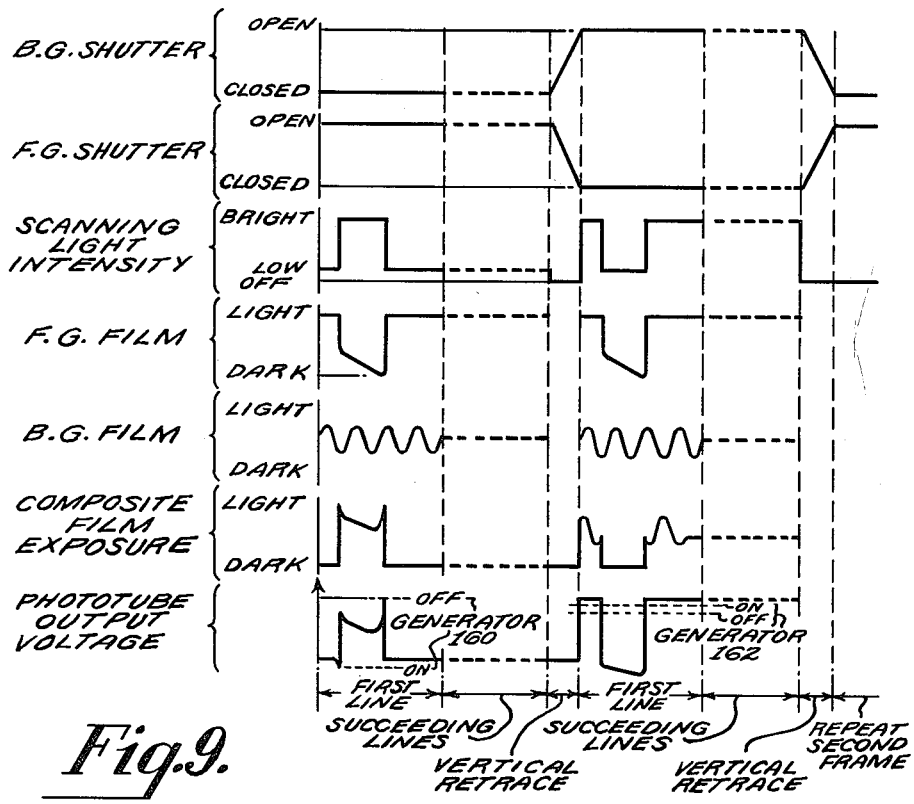
Figure 9 is an idealized graph of the time relationships of waveforms that may occur in certain portions of the system of Figure 8.

Figure 9 shows graphically the time relationships of certain operations occurring in the modified system of Figure 8. The operation of the system of Figure 8 will be apparent from the previous descriptions and from the graph of Figure 9. With the flip-flop initially reset, the foreground shutter 62 is opened, and the gate 168 is opened to pass the switching signals from the keying generator 160. The foreground film is illuminated to expose the composite film in the portions corresponding to the action region. There is but a negligible exposure of the composite film 42 in portions corresponding to the clear surround region of the foreground film 12 because the scanning light intensity is switched to a very low value in deflection positions corresponding to those surround regions.

After scanning of the entire frame to expose the composite film in accordance with the action region of the foreground film 12, the next vertical sync pulse 104 triggers the flip-flop 148 to the set condition. The background shutter 54 is then opened (the foreground shutter 62 is closed), and the gate 170 is opened (the gate 168 is closed). The background film is then illuminated to be imaged on the composite film 42. This time the clear surround of the foreground film 12 results in the keying generator 162 producing a full illumination intensity to expose the composite film in the corresponding regions. In the deflection positions corresponding to the action region, the scanning light intensity is reduced to a very low value by the keying generator 162. After the entire frame is scanned, the next vertical sync pulse 104 triggers the flip-flop 148 back to the reset condition to complete the cycle. This same resetting action may be used to actuate the film advance to bring the next input films 10 and 12 and output film 42 in proper position for repetition of the exposure cycle.

Related composite photography systems are described in copending patent applications, Serial No. 646,340 by H. E. Haynes, and Serial No. 646,265 by F. L. Putzrath, both filed concurrently herewith on March 15, 1957.

In accordance with this invention, a new and improved composite photography system is provided. Scanning illumination techniques are used for making composite photographs, such as traveling-matte composites.

What is claimed is:

1. In a system for exposing a photographic element as a composite of a plurality of photographic records, the combination comprising a light source, means for forming a light beam from said source for each of said records, means for simultaneously impressing each of all of said records with their respective light beams, means for exposing with one of said beams an area of said element in accordance with the image of a first one of said records, means for varying the intensity of another of said beams for subsequently exposing a different area of said element in accordance with the image of a second one of said records, means responsive to the variations in intensity of said first mentioned beam impressed on said first one of said records for varying the intensity of said other beam, and means for recording signals representing the variations in intensity of said first mentioned beam.

2. A system in accordance with claim 1 in which means are provided under control of said recorded signals for varying the intensity of said light source during the scanning of said second one of said records.

3. A system in accordance with claim 1 in which said last named means derives said signals in accordance with the image of said first one of said records, said system also including means controlled by said recorded signals for varying the intensity of said light source.

4. In a system for exposing a photographic element as a composite of a plurality of photographic records, the combination comprising means for producing a moving light spot, means for directing a portion of said light spot to a first one of said records, means for directing another portion of said light spot to a second one of said records, means for directing each portion of said light spot after modification by said respective records to said element at mutually exclusive times, said first mentioned portion of said light spot exposing said element in accordance with the image on said first one of said records, and said second mentioned portion of said light spot exposing said element in accordance with the image on said second one of said records, means for recording a record of the variations in intensity of said first mentioned portion of said light spot, and means controlled by said record for varying the intensity of said first mentioned means for producing a moving light spot.

5. A system in accordance with claim 4 in which said means for directing said portions of said light spot from said records to said element includes shutters controlled by said recorded record.

6. A system in accordance with claim 4 in which said photographic records are photographic transparencies.

7. A system in accordance with claim 4 in which said photographic records are photographic transparencies and a separate shutter is provided in each of said means for directing said respective light spots from said records to said element, and means are provided for operating said shutters in a certain sequence and in timed relation to traversals of said moving light spot to block at any time the exposure of said element by light transmitted through at least one of said transparencies.

References Cited in the file of this patent

UNITED STATES PATENTS

| | | |
|---|---|---|
| 2,073,370 | Goldsmith | Mar. 9, 1937 |
| 2,164,297 | Bedford | June 27, 1939 |
| 2,172,936 | Goldsmith | Sept. 12, 1939 |
| 2,730,565 | Owens | Jan. 10, 1956 |
| 2,757,571 | Loughren | Aug. 7, 1956 |

FOREIGN PATENTS

| | | |
|---|---|---|
| 701,884 | Great Britain | Jan. 6, 1954 |
| 489,644 | Italy | Jan. 25, 1954 |